United States Patent
Brown et al.

(10) Patent No.: US 9,146,741 B2
(45) Date of Patent: Sep. 29, 2015

(54) ELIMINATING REDUNDANT MASKING OPERATIONS INSTRUCTION PROCESSING CIRCUITS, AND RELATED PROCESSOR SYSTEMS, METHODS, AND COMPUTER-READABLE MEDIA

(71) Applicant: QUALCOMM Incorporated, San Diego, CA (US)

(72) Inventors: Melinda J. Brown, Raleigh, NC (US); Michael William Morrow, Wilkes-Barre, PA (US); James Norris Dieffenderfer, Apex, NC (US); Brian Michael Stempel, Raleigh, NC (US); Michael Scott McIlvaine, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 578 days.

(21) Appl. No.: 13/655,622

(22) Filed: Oct. 19, 2012

(65) Prior Publication Data

US 2013/0290683 A1    Oct. 31, 2013

Related U.S. Application Data

(60) Provisional application No. 61/638,677, filed on Apr. 26, 2012.

(51) Int. Cl.
*G06F 9/30* (2006.01)
*G06F 9/38* (2006.01)

(52) U.S. Cl.
CPC .......... *G06F 9/3017* (2013.01); *G06F 9/30018* (2013.01); *G06F 9/3838* (2013.01)

(58) Field of Classification Search
None
See application file for complete search history.

(56) References Cited

U.S. PATENT DOCUMENTS

| 4,095,278 A | 6/1978 | Kihara |
| 6,016,544 A | 1/2000 | Henry et al. |

(Continued)

FOREIGN PATENT DOCUMENTS

WO    8909962 A1    10/1989

OTHER PUBLICATIONS

Acharya, "Eliminating redundant barrier synchronizations in rule-based programsm" Proceeding: ICS '96 Proceedings of the 10th international conference on Supercomputing, 1996, pp. 325-332.

(Continued)

*Primary Examiner* — Scott Sun
(74) *Attorney, Agent, or Firm* — Paul S. Holdaway

(57) ABSTRACT

Eliminating redundant masking operations in instruction processing circuits and related processor systems, methods, and computer-readable media are disclosed. In one embodiment, a first instruction in an instruction stream indicating an operation writing a value to a first register is detected by an instruction processing circuit, the value having a value size less than a size of the first register. The circuit also detects a second instruction in the instruction stream indicating a masking operation on the first register. The masking operation is eliminated upon a determination that the masking operation indicates a read operation and a write operation on the first register and has an identity mask size equal to or greater than the value size. In this manner, the elimination of the masking operation avoids potential read-after-write hazards and improves performance of a CPU by removing redundant operations from an execution pipeline.

20 Claims, 8 Drawing Sheets

(56) References Cited

U.S. PATENT DOCUMENTS

| | | | |
|---|---|---|---|
| 6,049,860 | A | 4/2000 | Krygowski et al. |
| 6,067,415 | A | 5/2000 | Uchihira |
| 6,292,939 | B1 | 9/2001 | Itou et al. |
| 7,398,358 | B2 | 7/2008 | Dowling |
| 7,805,592 | B2 | 9/2010 | Joyce et al. |
| 2002/0178346 | A1 | 11/2002 | Elias et al. |
| 2004/0154006 | A1 | 8/2004 | Heishi et al. |
| 2011/0145304 | A1 | 6/2011 | Gray et al. |
| 2011/0145512 | A1 | 6/2011 | Adl-Tabatabai et al. |
| 2011/0258415 | A1 | 10/2011 | Chou et al. |
| 2013/0042090 | A1* | 2/2013 | Krashinsky .................. 712/214 |
| 2014/0281429 | A1 | 9/2014 | Brown et al. |

OTHER PUBLICATIONS

Ma, et al., "Barrier Optimization for OpenMP Program," This paper appears in: 10th ACIS International Conference on Software Engineering, Artificial Intelligences, Networking and Parallel/Distributed Computing, 2009. SNPD '09, Date of Conference: May 27-29, 2009, pp. 495-500.

Tseng, "Complier optimizations for eliminating barrier synchronization," Proceeding: PPOPP '95 Proceedings of the fifth ACM SIGPLAN symposium on Principles and practice of parallel programming, 1995, pp. 144-155.

International Search Report and Written Opinion—PCT/US2013/037768—ISA/EPO—Jul. 22, 2013.

\* cited by examiner

US 9,146,741 B2

ELIMINATING REDUNDANT MASKING OPERATIONS INSTRUCTION PROCESSING CIRCUITS, AND RELATED PROCESSOR SYSTEMS, METHODS, AND COMPUTER-READABLE MEDIA

PRIORITY APPLICATION

The present application claims priority to U.S. Provisional Patent Application Ser. No. 61/638,677 filed on Apr. 26, 2012 and entitled "REMOVING REDUNDANT MASKING INSTRUCTIONS FROM EXECUTION PIPELINES IN INSTRUCTION PROCESSING CIRCUITS, AND RELATED PROCESSOR SYSTEMS, METHODS, AND COMPUTER-READABLE MEDIA," which is hereby incorporated herein by reference in its entirety.

BACKGROUND

I. Field of the Disclosure

The technology of the disclosure relates generally to processing of pipelined computer instructions in central processing unit (CPU)-based systems.

II. Background

The advent of "instruction pipelining" in modern computer architectures has yielded improved utilization of CPU resources and faster execution times of computer applications. Instruction pipelining is a processing technique whereby a throughput of computer instructions being processed by a CPU may be increased by splitting the processing of each instruction into a series of steps. The instructions are executed in a "processor pipeline" composed of multiple stages, with each stage carrying out one of the steps for each of a series of instructions. As a result, in each CPU clock cycle, steps for multiple instructions can be evaluated in parallel. A CPU may employ multiple processor pipelines to further boost performance.

Occasionally, a pipeline "hazard" may arise wherein an instruction is prevented from executing during its designated CPU clock cycle. For instance, a first instruction that generates data relied upon by a second instruction may not completely execute before the second instruction begins execution. In this instance, a hazard (specifically, a "read-after-write" hazard) may occur. To resolve the read-after-write hazard, the CPU may "stall" or delay execution of the second instruction until the first instruction has completely executed.

One particular instance in which the possibility of a read-after-write hazard may occur is during the execution of a masking instruction, which may include operations for reading a value from a register, applying a specified mask, and/or writing a resulting masked value back to the register. Such a masking instruction may be dependent upon the execution of a preceding write instruction, raising the possibility of encountering a read-after-write hazard.

SUMMARY OF THE DISCLOSURE

Embodiments of the disclosure provide eliminating redundant masking operations in instruction processing circuits. Related processor systems, methods, and computer-readable media are also disclosed. In this regard, in one embodiment, an instruction processing circuit is provided. The instruction processing circuit is configured to detect a first instruction in an instruction stream indicating an operation writing a value to a first register, the value having a value size less than a size of the first register. The instruction processing circuit is also configured to detect a second instruction in the instruction stream indicating a masking operation on the first register. The instruction processing circuit is further configured to eliminate the masking operation upon a determination that the masking operation indicates a read operation and a write operation on the first register and has an identity mask size equal to or greater than the value size. In this manner, the elimination of the masking operation avoids potential read-after-write hazards and other associated consequences caused by dependencies between instructions in a pipelined computing architecture, and improves performance of a central processing unit (CPU) by removing the redundant operations from an execution pipeline.

In another embodiment, an instruction processing circuit is provided. The instruction processing circuit comprises a means for detecting a first instruction in an instruction stream indicating an operation writing a value to a first register, the value having a value size less than a size of the first register. The instruction processing circuit further comprises a means for detecting a second instruction in the instruction stream indicating a masking operation on the first register. The instruction processing circuit additionally comprises a means for eliminating the masking operation upon a determination that the masking operation indicates a read operation and a write operation on the first register and has an identity mask size equal to or greater than the value size.

In a further embodiment, a method for processing computer instructions is provided. The method comprises detecting a first instruction in an instruction stream indicating an operation writing a value to a first register, the value having a value size less than a size of the first register. The method also comprises detecting a second instruction in the instruction stream indicating a masking operation on the first register. The method further comprises eliminating the masking operation upon a determination that the masking operation indicates a read operation and a write operation on the first register and has an identity mask size equal to or greater than the value size.

In an additional embodiment, a non-transitory computer-readable medium is provided, having stored thereon computer-executable instructions to cause a processor to implement a method for detecting a first instruction in an instruction stream indicating an operation writing a value to a first register, the value having a value size less than a size of the first register. The method implemented by the computer-executable instructions also includes detecting a second instruction in the instruction stream indicating a masking operation on the first register. The method implemented by the computer-executable instructions further includes eliminating the masking operation upon a determination that the masking operation indicates a read operation and a write operation on the first register and has an identity mask size equal to or greater than the value size.

DESCRIPTION

Figure 1:
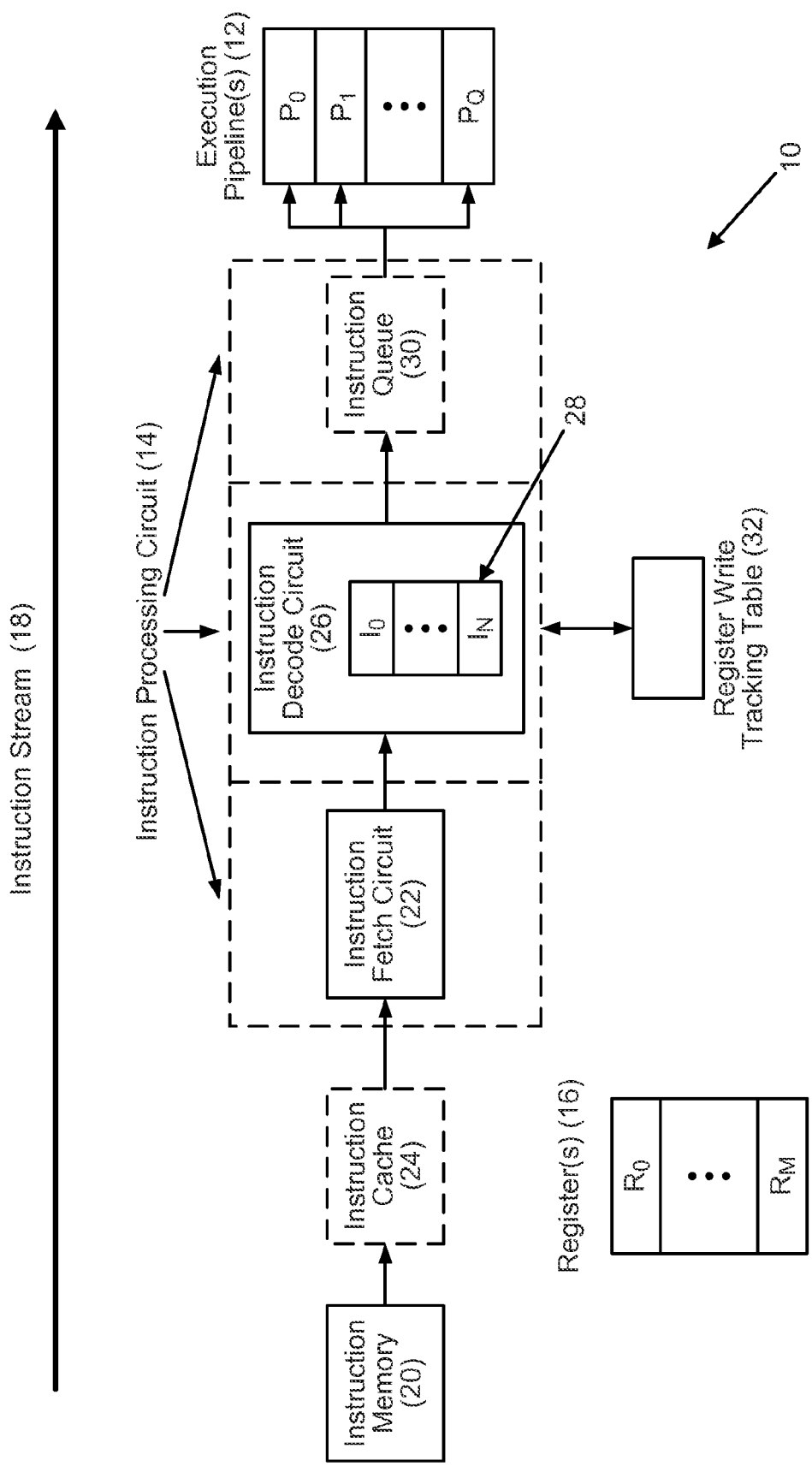
FIG. 1 is a block diagram of exemplary components provided in a processor-based system for retrieving and processing computer instructions to be placed into one or more execution pipelines, including an exemplary instruction processing circuit configured to detect and eliminate redundant masking operations.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments of the disclosure provide eliminating redundant masking operations in instruction processing circuits. Related processor systems, methods, and computer-readable media are also disclosed. In this regard, in one embodiment, an instruction processing circuit is provided. The instruction processing circuit is configured to detect a first instruction in an instruction stream indicating an operation writing a value to a first register, the value having a value size less than a size of the first register. The instruction processing circuit is also configured to detect a second instruction in the instruction stream indicating a masking operation on the first register. The instruction processing circuit is further configured to eliminate the masking operation upon a determination that the masking operation indicates a read operation and a write operation on the first register and has an identity mask size equal to or greater than the value size. In this manner, the elimination of the masking operation avoids potential read-after-write hazards and other associated consequences caused by dependencies between instructions in a pipelined computing architecture, and improves performance of a central processing unit (CPU) by removing the redundant operations from an execution pipeline.

In this regard, FIG. 1 is a block diagram of an exemplary processor-based system 10 for retrieving and processing computer instructions to be placed into one or more execution pipelines 12(0-Q). As will be discussed in more detail below, the processor-based system 10 provides an instruction processing circuit 14 that is configured to detect instructions and eliminate redundant masking operations. For example, the instructions may indicate operations for reading data from and/or writing data to registers 16(0-M), which provide local high-speed storage accessible by the processor-based system 10. As discussed herein, "instructions" may refer to a combination of bits defined by an instruction set architecture that direct a computer processor to carry out a specified task or set of tasks. Exemplary instruction set architectures include, but are not limited to, ARM, Thumb, and A64 architectures.

With continuing reference to FIG. 1, instructions are processed in the processor-based system 10 in a continuous flow represented by an instruction stream 18. The instruction stream 18 may continuously advance as the processor-based system 10 is operating and executing the instructions. In this illustrated example, the instruction stream 18 begins with instruction memory 20, which provides persistent storage for the instructions in a computer-executable program.

An instruction fetch circuit 22 reads an instruction from the instruction memory 20 and/or from an instruction cache 24, and may increment a program counter, typically stored in one of the registers 16(0-M). The instruction cache 24 is an optional buffer that may be provided and coupled to the instruction memory 20 and the instruction fetch circuit 22 to allow direct access to cached instructions by the instruction fetch circuit 22. The instruction cache 24 may speed up instruction retrieval times, but at a cost of potentially longer read times if the instruction has not been previously stored in the instruction cache 24.

Once the instruction is fetched by the instruction fetch circuit 22, the instruction proceeds to an instruction decode circuit 26, which translates the instruction into processor-specific microinstructions. In one embodiment, the instruction decode circuit 26 holds an instruction decode group 28(0-N) comprising a plurality of instructions present together in the instruction decode circuit 26 for simultaneous decoding. After the instructions have been fetched and decoded, they are optionally issued to an instruction queue 30 (i.e., a buffer for storing instructions) prior to being issued to one of the execution pipelines 12(0-Q), or they may be issued immediately to one of the execution pipelines 12(0-Q) for execution. In some embodiments, the execution pipeline(s) 12(0-Q) may restrict the types of operations that can be carried out by instructions that execute within the execution pipeline(s) 12(0-Q). For example, pipeline $P_0$ may not permit read access to the registers 16(0-M); accordingly, an instruction that indicates an operation to read register $R_0$ could only be issued to one of the execution pipeline(s) $P_1$ through $P_Q$.

With continuing reference to FIG. 1, the instruction processing circuit 14 is configured to eliminate redundant masking operations detected in the instruction stream 18. The instruction processing circuit 14 may be any type of device or circuit, and may be implemented or performed via a processor, a DSP, an Application Specific Integrated Circuit (ASIC), an FPGA or other programmable logic device, discrete gate or transistor logic, discrete hardware components, or any combination thereof designed to perform the functions described herein. In some embodiments, the instruction processing circuit 14 is incorporated into the instruction fetch circuit 22, the instruction decode circuit 26, and/or the optional instruction queue 30. Additionally, some embodiments of the instruction processing circuit 14 may use a register write tracking table 32 to store one or more indicators, wherein each indicator is associated with and used to track values written to one of the registers 16(0-M).

Figure 2:
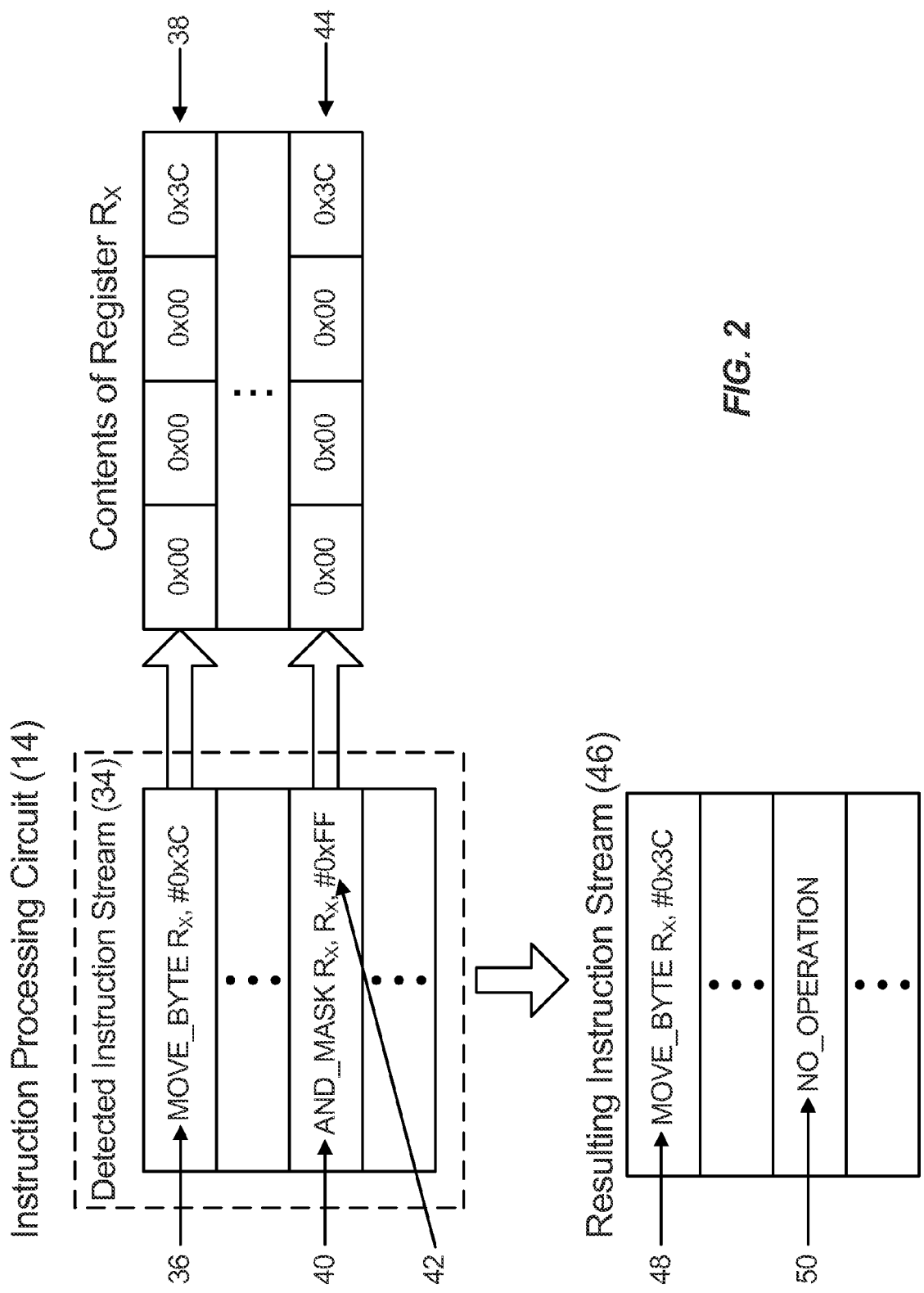
FIG. 2 is a diagram illustrating an exemplary resulting instruction stream generated by an instruction processing circuit based on detecting a first instruction writing a value to a register and a second instruction indicating a redundant masking operation.

To provide an explanation of detecting and eliminating redundant masking operations in the processor-based system 10 in FIG. 1, FIG. 2 is provided. FIG. 2 illustrates the instruction processing circuit 14 of FIG. 1 detecting a write instruction writing to a register (referred to in this example as register $R_X$), and subsequently detecting a redundant masking instruction applying an identity mask to the value stored in the register $R_X$. In this example, a detected instruction stream 34 represents a series of instructions fetched in the instruction stream 18 and detected by the instruction processing circuit 14. First in the detected instruction stream 34 is a MOVE_BYTE write instruction 36. The MOVE_BYTE write instruction 36 indicates an operation writing an immediate value byte having a hexadecimal value of 0x3C into the register $R_X$. After the MOVE_BYTE write instruction 36 executes, the register $R_X$ (in this example, a 32-bit register) contains zero values in its upper three bytes and the hexadecimal value 0x3C in its lowest byte, as illustrated by register contents 38.

Further along in the detected instruction stream 34 is an AND_MASK masking instruction 40. The AND_MASK masking instruction 40 indicates a read operation to obtain a value from the register $R_X$, a masking operation to apply a mask 42 to the obtained value using a logical AND operation, and a write operation to store a resulting masked value in the register $R_X$. In this example, the mask 42 has a single-byte hexadecimal value of 0xFF. It is commonly understood that a logical AND operation on a 32-bit value using a mask having a single-byte hexadecimal value of 0xFF has the effect of zeroing out the top three bytes of the 32-bit value while maintaining the value of the lowest byte. Consequently, because the register $R_X$ currently stores only a single-byte value, the result of the execution of the AND_MASK masking instruction 40 using the mask 42 has no net effect on the value in the register $R_X$, as illustrated by register contents 44. The mask 42, therefore, may be considered an "identity mask" with respect to the single-byte value in the register $R_X$. As referred to more generally herein, an identity mask refers to a mask that (1) has a size of K bits, where K is equal to or greater than the size of a target value to which the mask is applied, and (2) has a value of $2^K-1$ (i.e., the binary value of the mask value is a 1 bit repeated K times), such that (3) applying the identity mask to the target value using a logical AND masking operation results in the same target value. In this example, the mask 42 is the same size (8 bits) as the byte value in register $R_X$, and the hexadecimal value 0xFF of the mask 42 is equivalent to a binary value of 0b11111111 ($2^8-1$, or 255 in decimal notation).

Upon detecting the AND_MASK masking instruction 40 in the detected instruction stream 34, the instruction processing circuit 14 determines that the AND_MASK masking instruction 40 indicates a read operation and a write operation on the register $R_X$, and that the AND_MASK masking instruction 40 uses an identity mask (the mask 42) with a size equal to the size of the value stored in the register $R_X$. The AND_MASK masking instruction 40 is therefore determined by the instruction processing circuit 14 to be redundant. Accordingly, the instruction processing circuit 14 eliminates the masking operation of the AND_MASK masking instruction 40 from the detected instruction stream 34.

A resulting instruction stream 46 illustrates one exemplary result. The resulting instruction stream 46 includes a MOVE_BYTE write instruction 48 corresponding to the MOVE_BYTE write instruction 36 in the detected instruction stream 34. In the resulting instruction stream 46, however, the instruction processing circuit 14 eliminates the masking operation by replacing the AND_MASK masking instruction 40 with a NO_OPERATION instruction 50, indicating that no operation is to be executed. In some embodiments, the masking operation may be eliminated by removing the AND_MASK masking instruction 40 from the resulting instruction stream 46 without replacing the AND_MASK masking instruction 40 with another instruction. According to some embodiments, the masking operation may be eliminated by modifying the AND_MASK masking instruction 40 to have no effect on the register $R_X$. It is to be understood that, in some embodiments, the AND_MASK masking instruction 40 may be detected immediately subsequent to the MOVE_BYTE write instruction 36 in the detected instruction stream 34. According to some embodiments, the MOVE_BYTE write instruction 36 and the AND_MASK masking instruction 40 may be separated in the detected instruction stream 34 by other intervening instructions.

Figure 3:
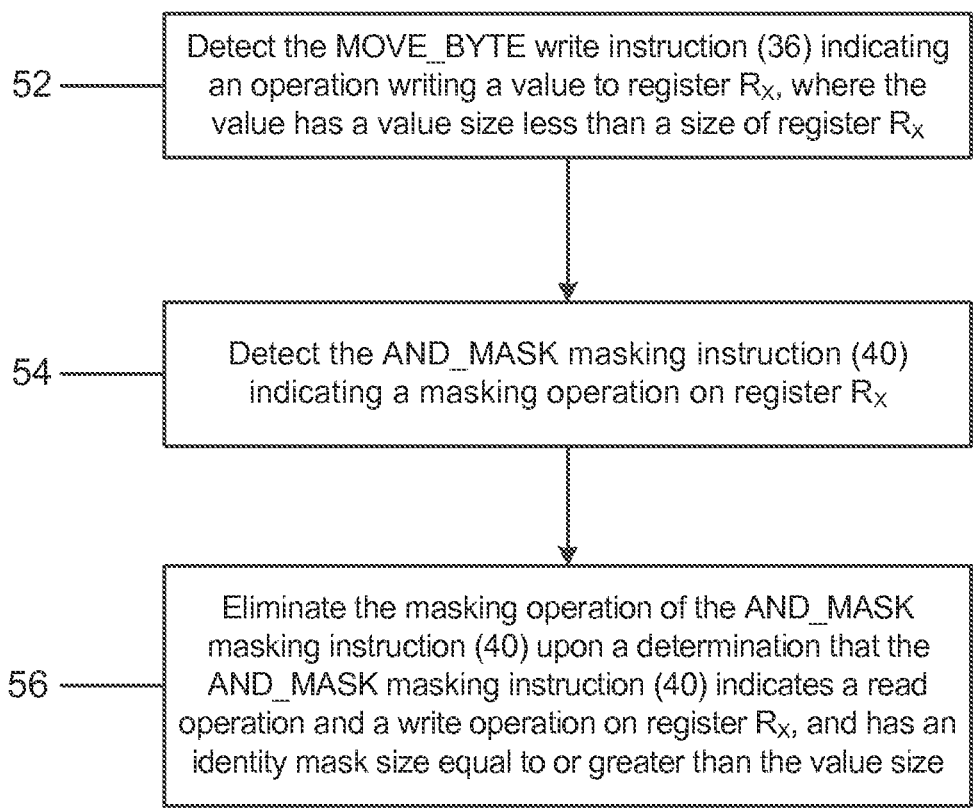
FIG. 3 is a flowchart illustrating an exemplary process for detecting and eliminating redundant masking operations in an instruction stream by an instruction processing circuit.

FIG. 3, with further reference to FIGS. 1 and 2, illustrates an exemplary generalized process for an instruction processing circuit configured to detect a write instruction and remove a subsequent masking operation. In this example, the process begins by the instruction processing circuit 14 detecting the MOVE_BYTE write instruction 36 writing a value to the target register $R_X$, where the value has a value size less than a size of the register $R_X$ (block 52). The instruction processing circuit 14 next detects the AND_MASK masking instruction 40 indicating a masking operation on the register $R_X$ (block 54). The instruction processing circuit 14, upon determining that the AND_MASK masking instruction 40 indicates a read operation and a write operation on the register $R_X$ and has an identity mask size equal to or greater than the value size, then eliminates the masking operation of the AND_MASK masking instruction 40 (block 56).

Figure 4:
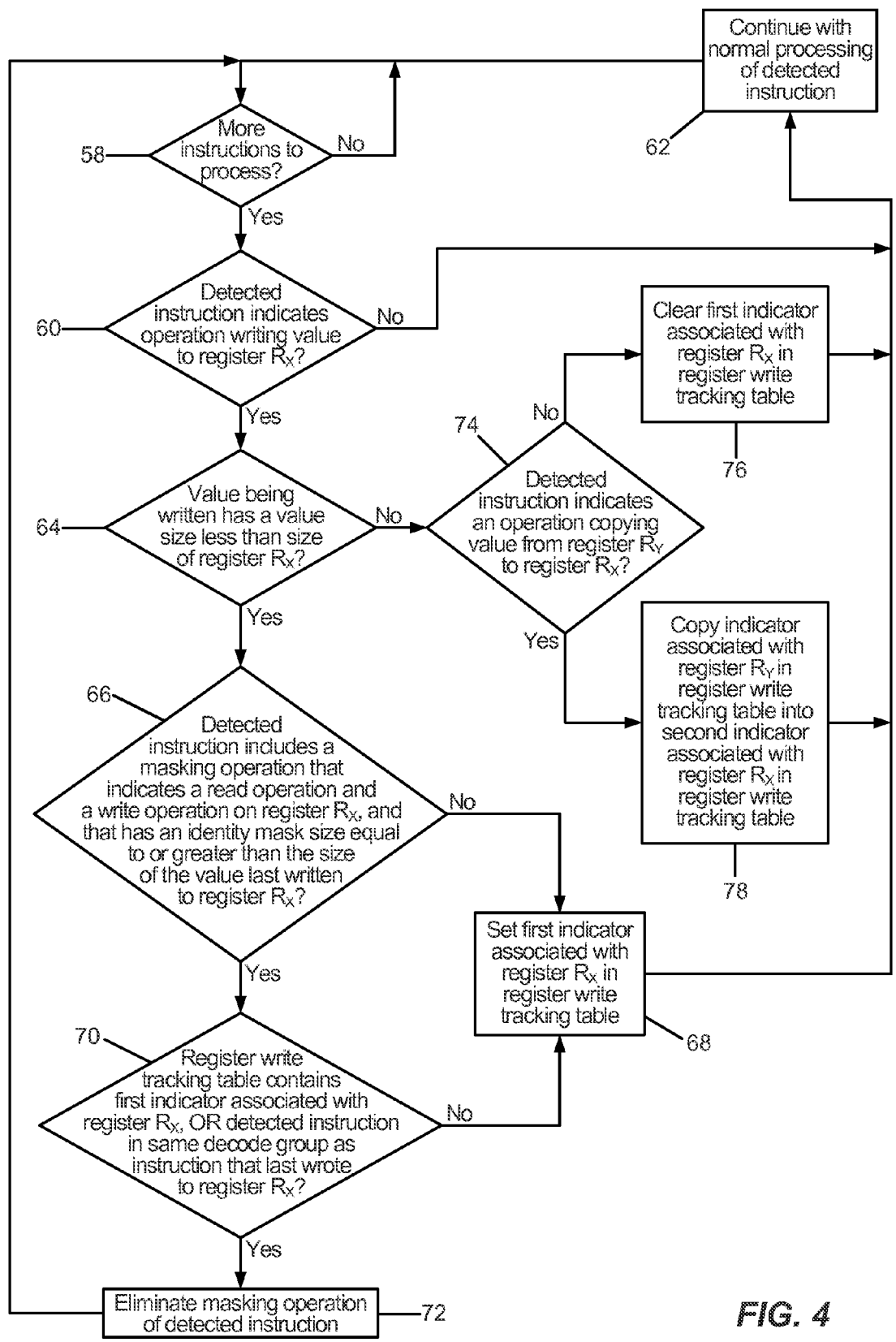
FIG. 4 is a flowchart detailing an exemplary process for an instruction processing circuit detecting a presence of a write instruction and a redundant masking operation, and eliminating the redundant masking operation.

To illustrate a more detailed exemplary process of an instruction processing circuit (e.g., the instruction processing circuit 14 of FIG. 1) for eliminating redundant masking operations in an instruction stream (such as the instruction stream 18 of FIG. 1), FIG. 4 is provided. The process in this example begins with the instruction processing circuit detecting whether there are more instructions remaining to be processed (block 58 in FIG. 4). In some embodiments, this detection is accomplished by detecting the presence of unprocessed instructions in an instruction fetch circuit and/or an instruction decode circuit (such as the instruction fetch circuit 22 and the instruction decode circuit 26, respectively, of FIG. 1). If no remaining instructions are detected, the instruction processing circuit returns to block 58 in FIG. 4 and the process begins anew.

If a remaining instruction is detected at block 58 of FIG. 4, the instruction processing circuit next determines whether the detected instruction is a write instruction indicating an operation writing a value to a first register (such as one of the registers 16(0-M) of FIG. 1, referred to in this example as the target register $R_X$) (block 60 of FIG. 4). In the event that the detected instruction is not a write instruction, normal processing of the detected instruction continues (block 62 of FIG. 4). If the detected instruction is a write instruction, the instruction processing circuit then compares a size of the value written to the register $R_X$ with a size of the register $R_X$ to determine if the value size is less than the size of the register $R_X$ (block 64 of FIG. 4).

If the value size is determined to be less than the size of the register $R_X$, the instruction processing circuit examines the detected instruction at block 66 of FIG. 4 to evaluate whether the detected instruction includes a masking operation that indicates a read operation and a write operation on the register $R_X$, and that has an identity mask size equal to or greater than the size of the value last written to the register $R_X$. In some embodiments, determining whether the masking operation has an identity mask size equal to or greater than the size of the value previously written to the register $R_X$ may be accomplished by comparing the size of the identity mask to a predefined size and/or to a numeric value of an indicator associated with the register $R_X$ in the register write tracking table. If any of the conditions in block 66 are not met, the detected instruction is not identified as a redundant masking operation.

Accordingly, the instruction processing circuit may set a first indicator associated with the register $R_X$ in the register write tracking table to indicate that a value was written to the register $R_X$ (block 68 in FIG. 4). In some embodiments, the first indicator associated with the register $R_X$ in the register write tracking table may comprise a Boolean flag indicating that a value of a defined size (e.g., a value having a size of one byte) has been written to the register $R_X$. Some embodiments may provide that the first indicator associated with the register $R_X$ in the register write tracking table is a numeric value indicating the size (e.g., in bits) of a value written to the register $R_X$. After the instruction processing circuit sets the first indicator, processing continues at block 62 of FIG. 4.

However, if all of the conditions at decision block 66 of FIG. 4 are satisfied, the instruction processing circuit next determines whether the register write tracking table contains a first indicator associated with register $R_X$, or whether the detected instruction is within the same instruction decode group (such as the instruction decode group 28(0-N) of the instruction decode circuit 26 of FIG. 1) as the instruction that last wrote to register $R_X$ (block 70 of FIG. 4). If neither of these conditions is met, the detected instruction is not identified as a redundant masking operation. Accordingly, the instruction processing circuit may set a first indicator associated with the register $R_X$ in the register write tracking table to indicate that a value was written to the register $R_X$, as described in detail above (block 68 in FIG. 4). If, however, either of the conditions in decision block 70 of FIG. 4 is met, the detected instruction is identified as a redundant masking operation. The instruction processing circuit therefore eliminates the masking operation of the detected instruction from the instruction stream (block 72 of FIG. 4). As discussed above with respect to FIG. 2, the masking operation may be eliminated by, for example, replacing the detected instruction with an instruction indicating no operation (e.g., a NOP instruction), by removing the detected instruction from the instruction stream without replacing it with another instruction, or by modifying the detected instruction to have no effect on the register $R_X$, among other ways. After elimination of the masking operation of the detected instruction is complete, processing resumes at block 58 of FIG. 4.

Referring back to decision block 64 of FIG. 4, if the size of the value being written to the register $R_X$ is not less than the size of the register $R_X$, it is unlikely that any subsequent instruction will apply a mask that would act as an identity mask for the value in the register $R_X$. Thus, the instruction processing circuit next considers whether the detected instruction indicates an operation copying a value from a source register (such as one of the registers 16(0-M) of FIG. 1, referred to in this example as the register $R_Y$) to the register $R_X$ (block 74 of FIG. 4). If not, the instruction processing circuit clears a first indicator associated with the register $R_X$ in the register write tracking table (block 76 in FIG. 4). Processing of the detected instruction then continues (block 62 in FIG. 4), and the instruction processing circuit returns to block 58 of FIG. 4.

If, however, the detected instruction does indicate an operation copying a value from the register $R_Y$ to the register $R_X$, it logically follows that an indicator associated with the register $R_Y$ in the register write tracking table will also be applicable to the register $R_X$ once the operation of copying the value from the register $R_Y$ into the register $R_X$ has been executed. Accordingly, the instruction processing circuit copies a first indicator associated with the register $R_Y$ in the register write tracking table into a second indicator associated with the register $R_X$ in the register write tracking table (block 78 of FIG. 4). This ensures that any subsequent masking operation that would be considered redundant if applied to the register $R_Y$ will also be considered redundant with respect to the register $R_X$. Processing of the detected instruction then resumes at block 62 of FIG. 4.

Figure 5:
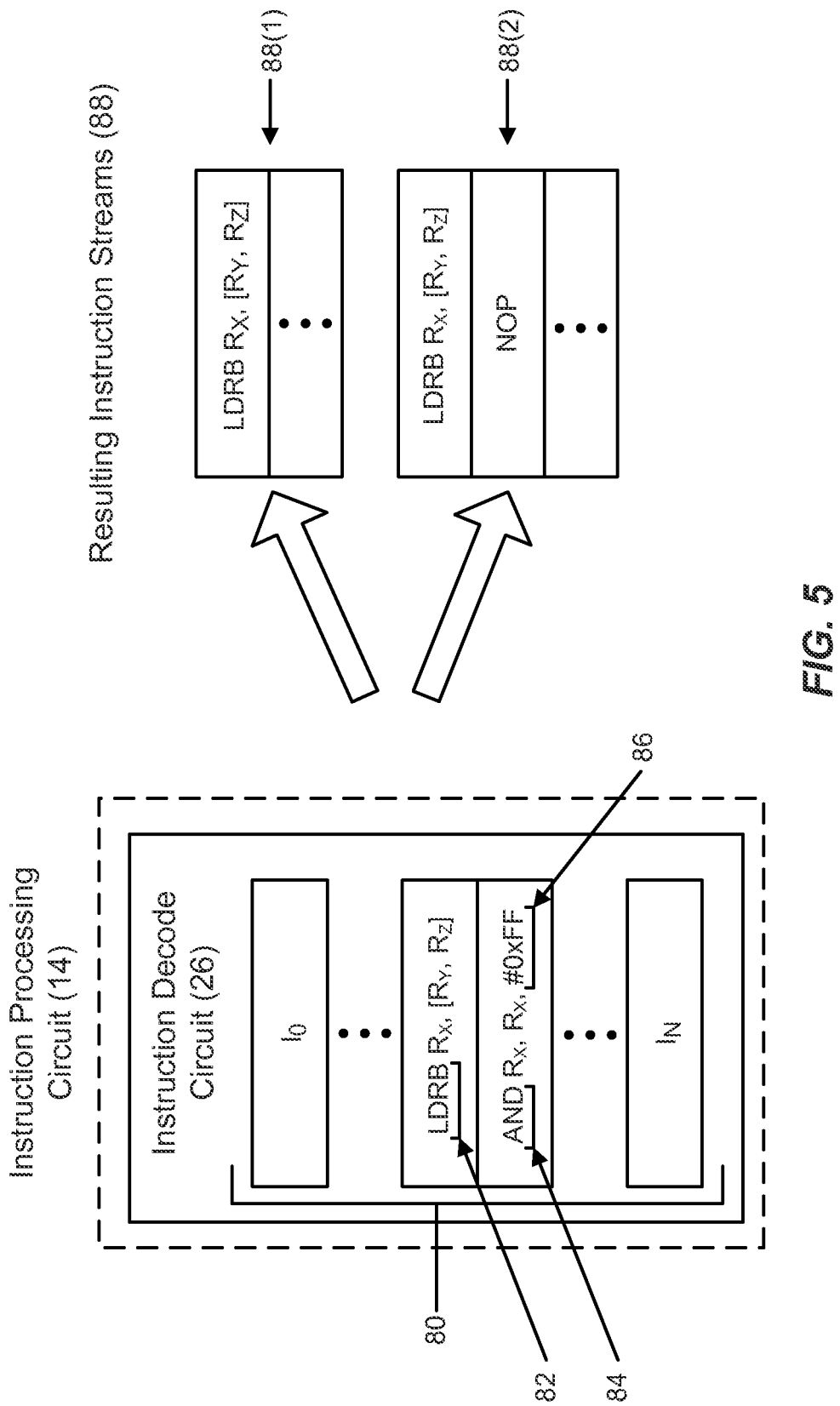
FIG. 5 is a diagram showing exemplary instruction streams resulting from an instruction processing circuit eliminating a redundant masking operation within a single instruction decode group in an instruction decode circuit.

FIG. 5 is provided to better illustrate an exemplary process for detecting and eliminating a masking operation for a masking instruction that is detected in a same instruction decode group as a write instruction. In FIG. 5, the instruction processing circuit 14 includes the instruction decode circuit 26, which processes an instruction decode group 80 (e.g., the instruction decode group 28(0-N) of FIG. 1). The instruction decode group 80 comprises instructions $I_0$ to $I_N$, and in this example includes an ARM architecture LDRB (load register byte) instruction 82 and an ARM architecture AND (logical AND) instruction 84. The LDRB instruction 82 retrieves a byte value stored in a memory address specified by values stored in two of the registers (e.g., two of the registers 16(0-M) of FIG. 1) (referred to in this example as the registers $R_Y$ and $R_Z$), and writes the value into one of the registers (e.g., one of the registers 16(0-M) of FIG. 1) (here, the register $R_X$). The AND instruction 84 then applies a mask 86 having a hexadecimal value of 0xFF to the value in the register $R_X$, and stores the masked result in the register $R_X$. Because the value written to the register $R_X$ by the LDRB instruction 82 is a single-byte value, the mask 86 having a hexadecimal value of 0xFF operates as an identity mask for the value stored in the register $R_X$. Accordingly, the instruction processing circuit 14 will identify the masking operation of the AND instruction 84 as redundant, and the masking operation will be eliminated from the instruction stream (e.g., the instruction stream 18 of FIG. 1) by the instruction processing circuit 14.

Exemplary resulting instruction streams 88 of FIG. 5 illustrate two exemplary instruction streams that may result from the elimination of the masking operation of the AND instruction 84 in some embodiments. In resulting instruction stream 88(1), the AND instruction 84 has been completely removed, leaving only the LDRB instruction 82. In contrast, in resulting instruction stream 88(2), the AND instruction 84 has been replaced by an ARM architecture NOP (no operation) instruction indicating no operation. In both of the resulting instruction streams 88, the redundant masking operation of the AND instruction 84 has been eliminated, thus avoiding potential read-after-write hazards and improving the performance of the CPU.

Figure 6:
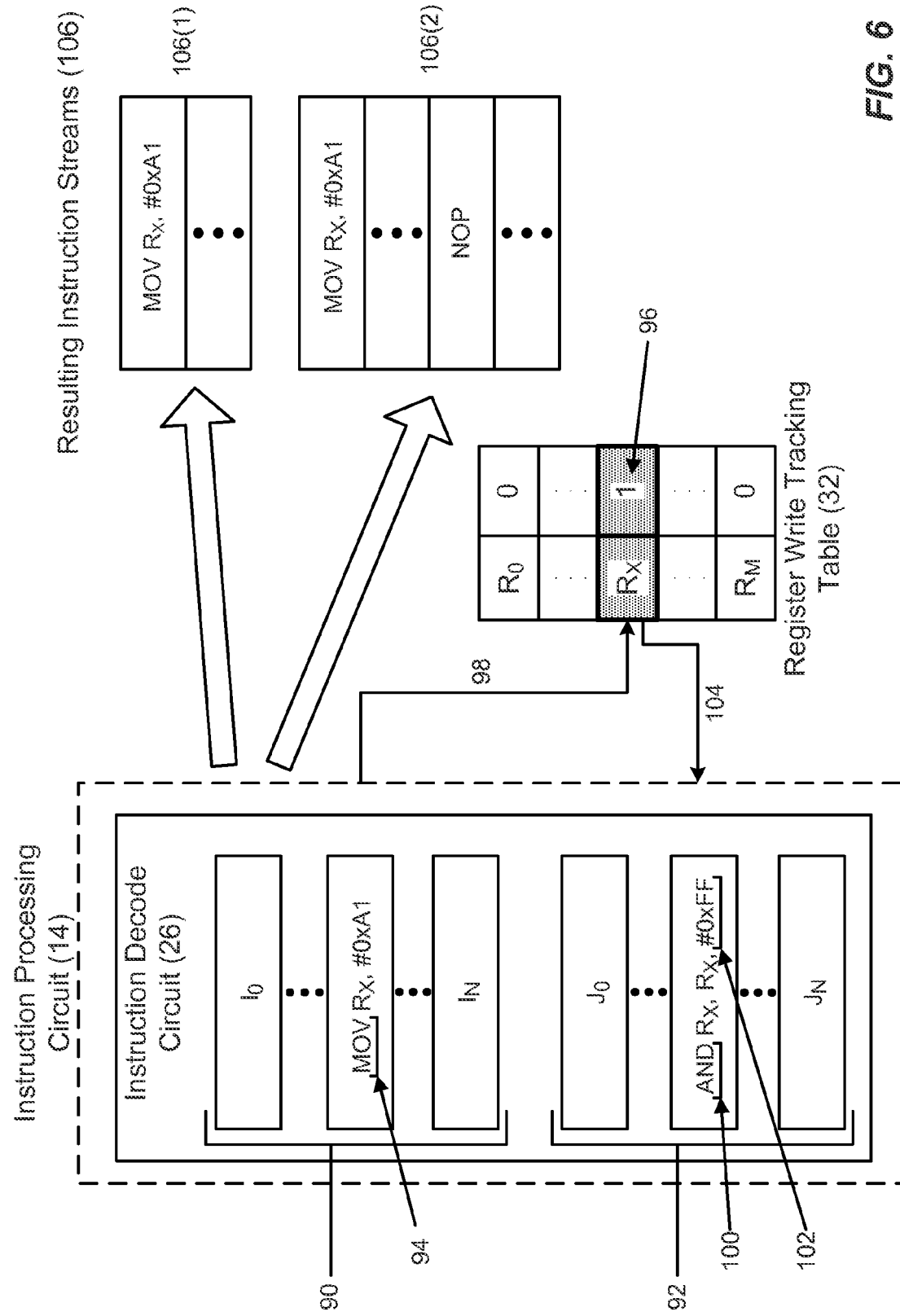
FIG. 6 is a diagram illustrating exemplary instruction streams resulting from an instruction processing circuit eliminating a redundant masking operation within different instruction decode groups in an instruction decode circuit through the use of a register write tracking table.

FIG. 6 provides an illustration of the instruction processing circuit 14 detecting and eliminating a masking operation for a masking instruction based on an indicator in the register write tracking table 32 of FIG. 1. In FIG. 6, the instruction processing circuit 14 of FIG. 1 includes the instruction decode circuit 26, which processes instruction decode groups 90 and 92 (each of which may correspond to, for instance, an instruction decode group such as the instruction decode group 28 of FIG. 1). The instruction decode group 90 is processed first by the instruction decode circuit 26 and comprises instructions $I_0$ to $I_N$, including an ARM architecture MOV (move) instruction 94. The MOV instruction 94 indicates an operation to move an immediate byte value having a hexadecimal value of 0xA1 into one of the registers (e.g., one of the registers 16(0-M) of FIG. 1) (referred to in this example as register $R_X$). Upon encountering the MOV instruction 94, the instruction processing circuit 14 sets an indicator 96 associated with the register $R_X$ in the register write tracking table 32 (shown by arrow 98). In the embodiment illustrated by this example, the writing of a byte value to a register is being tracked; accordingly, the indicator 96 in this example is a Boolean flag that, when set, indicates that a byte value has been written to a corresponding register. In other embodiments in which the writing of values of varying sizes may be tracked, the indicator 96 may comprise a numeric value indicating the size of a value that was previously written to a corresponding register.

The instruction decode circuit 26 next processes the instruction decode group 92, which comprises instructions $J_0$ to $J_N$, and includes an ARM architecture AND (logical AND) instruction 100. The AND instruction 100 applies a mask 102 having a hexadecimal value of 0xFF to the value in the register $R_X$, and stores the result in the register $R_X$. The mask 102 having a hexadecimal value of 0xFF operates as an identity mask for any single-byte value; accordingly, to determine whether the masking operation of the AND instruction 100 is redundant, the instruction processing circuit 14 examines the indicator 96 associated with the register $R_X$ in the register write tracking table 32 to determine if the register $R_X$ contains a byte value (shown by arrow 101). Because the indicator 96 in this example is set (indicating that a byte value was written to the register $R_X$), the instruction processing circuit 14 concludes that the masking operation of the AND instruction 100 is redundant, and the masking operation is eliminated.

FIG. 6 also shows exemplary resulting instruction streams 106 that may be generated by the elimination of the masking operation of the AND instruction 100 in some embodiments. In the resulting instruction stream 106(1), the AND instruction 100 has been completely removed, leaving only the MOV instruction 94. In contrast, in the resulting instruction stream 106(2), the AND instruction 100 has been replaced by an ARM architecture NOP (no operation) instruction indicating no operation. In both of the resulting instruction streams 106, the redundant masking operation of the AND instruction 100 has been eliminated, thus avoiding potential read-after-write hazards and improving the performance of the CPU.

Figure 7:
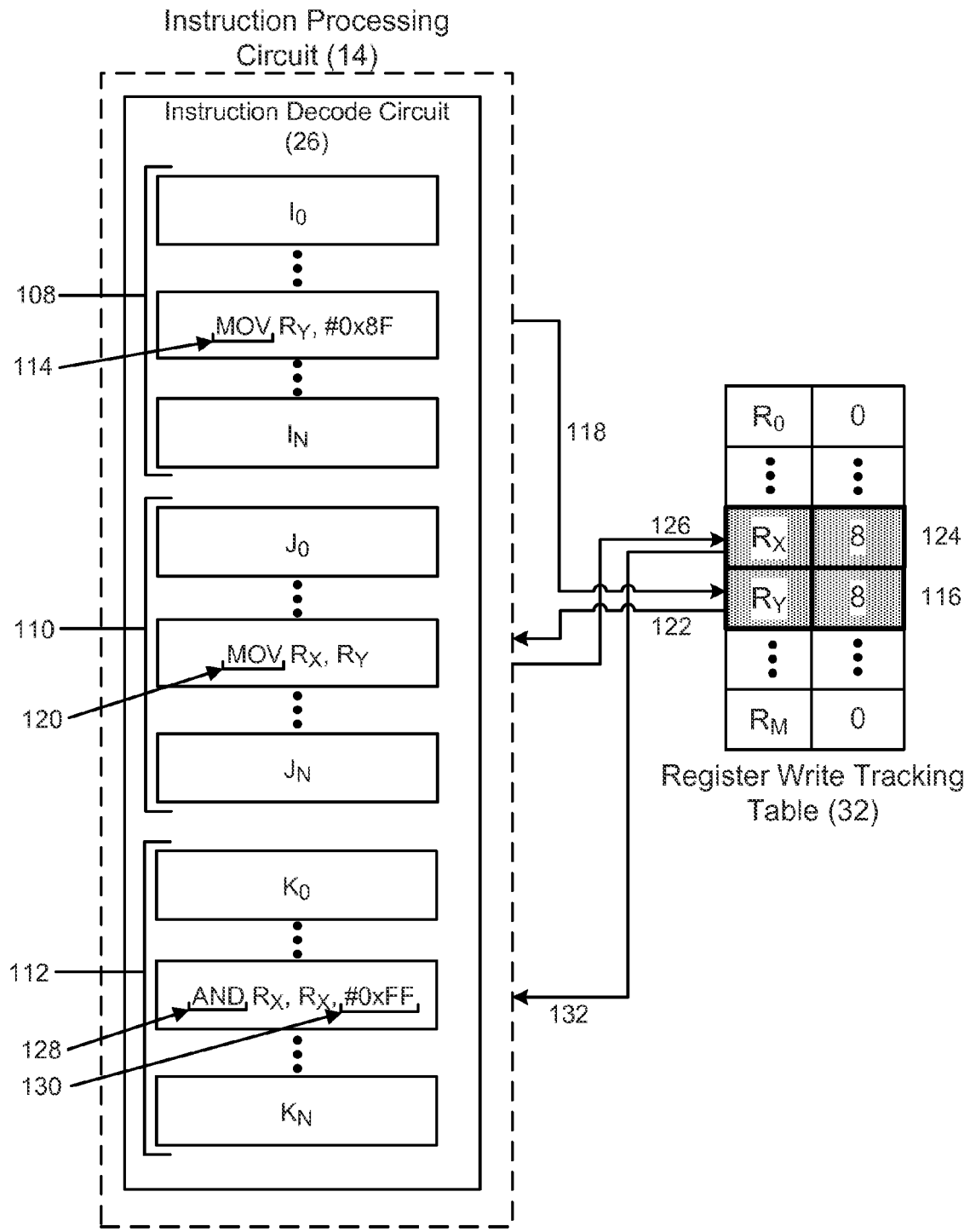
FIG. 7 is a diagram showing an instruction processing circuit detecting an instruction indicating an operation moving a value from a first register to a second register, and setting an indicator associated with the second register in response.

To better illustrate an instruction processing circuit copying an indicator associated with a source register of a write operation into an indicator associated with a target register of a write operation, FIG. 7 is provided. In FIG. 7, the instruction processing circuit 14 of FIG. 1 includes the instruction decode circuit 26, which processes instruction decode groups 108, 110, and 112, (each of which may correspond to, for instance, an instruction decode group, such as the instruction decode group 28 of FIG. 1). The instruction decode group 108 is processed first by the instruction decode circuit 26, and comprises instructions $I_0$ to $I_N$, which includes an ARM architecture MOV (move) instruction 114. The MOV instruction 114 indicates an operation to move an immediate byte value having a hexadecimal value of 0x8F into one of the registers (e.g., one of the registers 16(0-M) of FIG. 1) (referred to in this example as register $R_Y$). Upon encountering the MOV instruction 114, the instruction processing circuit 11 sets an indicator 116 associated with the register $R_Y$ in the register write tracking table 32 (shown by arrow 118). In the embodiment illustrated by this example, the writing of values of varying sizes are tracked; accordingly, the indicator 116 is a numeric value indicating a size of a value that was recently written to a corresponding register (here, an immediate byte value was written to the register $R_Y$ by the MOV instruction 114, so the indicator 116 stores the numeric value 8). In other embodiments, only the writing of a byte value or other defined value size to a register may be tracked. In that case, the indicator 116 may be a Boolean flag that, when set, indicates that a value of a defined size has been written to a corresponding register.

The instruction decode circuit 26 next processes the instruction decode group 110, which comprises instructions $J_0$ to $J_N$. The instruction decode group 110 includes an ARM architecture MOV instruction 120 indicating an operation copying a value stored in the register $R_Y$ into another one of the registers (e.g., one of the registers 16(0-M) of FIG. 1) (referred to in this example as the register $R_X$). Upon encountering the MOV instruction 120, the instruction processing circuit 14 accesses the indicator 116 associated with the register $R_Y$ in the register write tracking table 32 (as shown by arrow 122). The instruction processing circuit 14 then determines that the indicator 116 has been set, and consequently sets an indicator 124 associated with the register $R_X$ in the register write tracking table 32 (shown by arrow 126). In this manner, the instruction processing circuit 14 may be able to detect redundant masking operations applied to the register $R_X$.

The instruction decode circuit 26 then processes the instruction decode group 112, which comprises instructions $K_0$ to $K_N$. The instruction decode group 112 includes an ARM architecture AND (logical AND) instruction 128. The AND instruction 128 reads the value stored in the register $R_X$, applies a mask 130 having a hexadecimal value of 0xFF to the value in the register $R_X$, and stores the result in the register $R_X$. Because the value originally written to the register $R_Y$ by the MOV instruction 114 and subsequently copied into the register $R_X$ by the MOV instruction 120 is a byte value, the mask 130 having a hexadecimal value of 0xFF operates as an identity mask for the value stored in the register $R_X$. Accordingly, to determine whether the masking operation of the AND instruction 128 is redundant with respect to the register $R_X$, the instruction processing circuit 14 examines the indicator 124 associated with the register $R_X$ in the register write tracking table 32 (shown by arrow 132). Because the indicator 124 in this example has been set, the instruction processing circuit 14 may conclude, based on the numeric value of the indicator 124, that the masking operation of the AND instruction 128 is redundant, and the masking operation may be eliminated (not shown).

The instruction processing circuits for eliminating redundant masking operations according to embodiments disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 8:
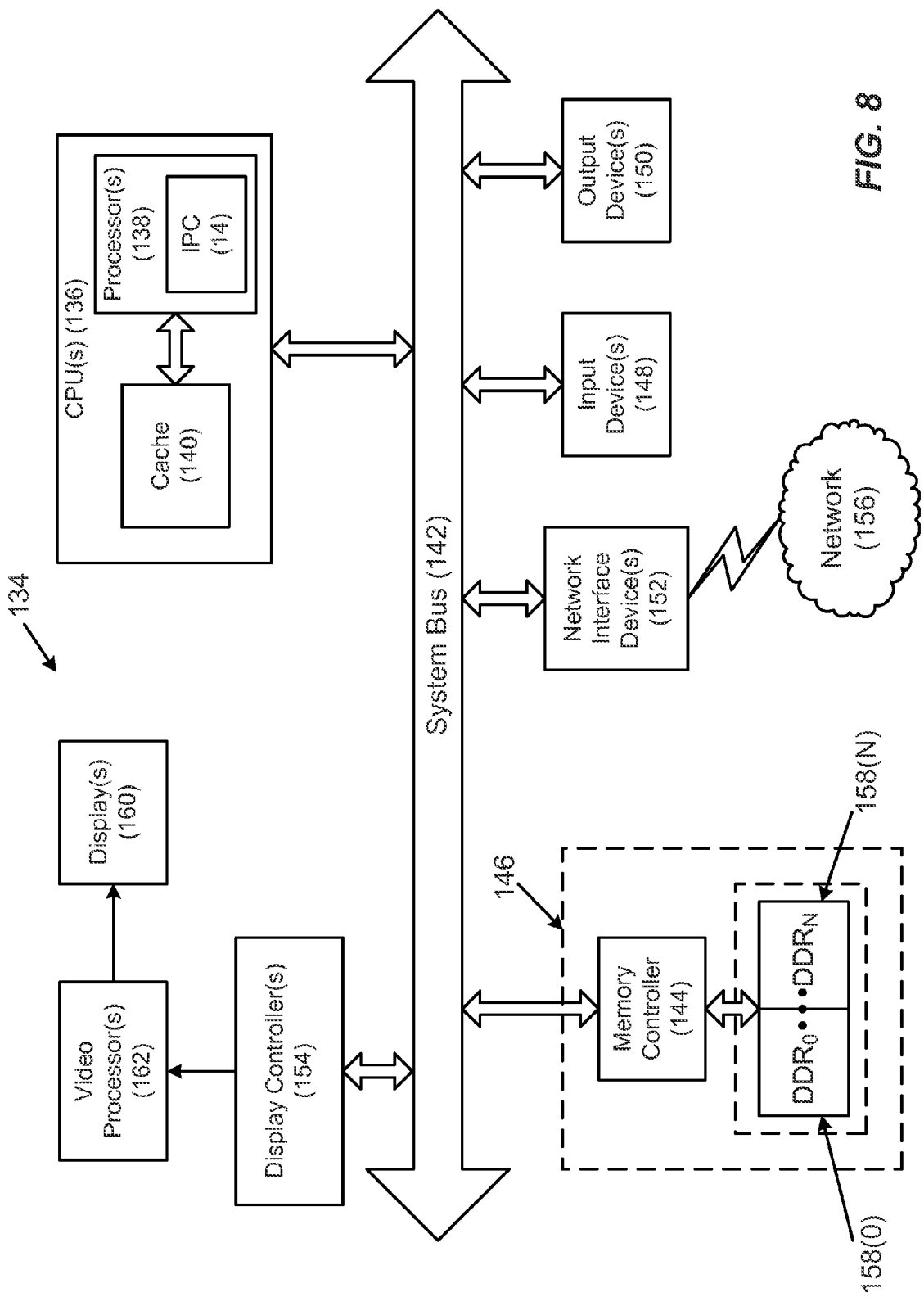
FIG. 8 is a diagram of an exemplary processor-based system that can include instruction processing circuits, including the instruction processing circuit of FIG. 1, configured to detect and eliminate redundant masking operations.

In this regard, FIG. 8 illustrates an example of a processor-based system 134 that can employ the instruction processing circuit 14 illustrated in FIG. 1. In this example, the processor-based system 134 includes one or more central processing units (CPUs) 136, each including one or more processors 138. The processor(s) 138 may comprise the instruction processing circuit (IPC) 14. The CPU(s) 136 may have cache memory 140 coupled to the processor(s) 138 for rapid access to temporarily stored data. The CPU(s) 136 is coupled to a system bus 142 and can intercouple master and slave devices included in the processor-based system 134. As is well known, the CPU(s) 136 communicates with these other devices by exchanging address, control, and data information over the system bus 142. For example, the CPU(s) 136 can communicate bus transaction requests to a memory controller 144, as an example of a slave device. Although not illustrated in FIG. 8, multiple system buses 142 could be provided.

Other master and slave devices can be connected to the system bus 142. As illustrated in FIG. 8, these devices can include a memory system 146, one or more input devices 148, one or more output devices 150, one or more network interface devices 152, and one or more display controllers 154, as examples. The input device(s) 148 can include any type of input device, including but not limited to input keys, switches, voice processors, etc. The output device(s) 150 can include any type of output device, including but not limited to audio, video, other visual indicators, etc. The network interface device(s) 152 can be any device(s) configured to allow exchange of data to and from a network 156. The network 156 can be any type of network, including but not limited to a wired or wireless network, a private or public network, a local area network (LAN), a wide local area network (WLAN), and the Internet. The network interface device(s) 152 can be configured to support any type of communication protocol desired. The memory system 146 can include one or more memory units 158(0-N).

The CPU(s) 136 may also be configured to access the display controller(s) 154 over the system bus 142 to control information sent to one or more displays 160. The display controller(s) 154 sends information to the display(s) 160 to be displayed via one or more video processors 162, which process the information to be displayed into a format suitable for the display(s) 160. The display(s) 160 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The master devices and slave devices described herein may be employed in any circuit, hardware component, integrated circuit (IC), IC chip, or semiconductor die, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a DSP, an Application Specific Integrated Circuit (ASIC), an FPGA or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. An instruction processing circuit configured to:
   detect a first instruction in an instruction stream indicating an operation writing a value to a first register, the value having a value size less than a size of the first register;
   detect a second instruction in the instruction stream indicating a masking operation on the first register; and
   eliminate the masking operation upon a determination that the masking operation indicates a read operation and a write operation on the first register and has an identity mask size equal to or greater than the value size.

2. The instruction processing circuit of claim 1 further configured to, in response to a detection of the first instruction:
   set a first indicator associated with the first register in a register write tracking table; and
   eliminate the masking operation based on the first indicator.

3. The instruction processing circuit of claim 1 configured to detect the first instruction and the second instruction within a single instruction decode group in an instruction decode circuit.

4. The instruction processing circuit of claim 1 configured to eliminate the masking operation by removing the second instruction from the instruction stream.

5. The instruction processing circuit of claim 1 configured to eliminate the masking operation by replacing the second instruction in the instruction stream with an instruction indicating no operation.

6. The instruction processing circuit according to claim 1, configured to:
   detect the first instruction as an ARM architecture-based instruction selected from the group consisting of an LDRB instruction, a MOV instruction, and an AND instruction; and
   detect the second instruction as an ARM architecture-based AND instruction.

7. The instruction processing circuit of claim 2 configured to set the first indicator associated with the first register and indicating the value size in the register write tracking table.

8. The instruction processing circuit of claim 2 further configured to detect the first instruction and the second instruction as not being within a single instruction decode group in an instruction decode circuit.

9. The instruction processing circuit according to claim 2, further configured to:
   detect a third instruction in the instruction stream indicating an operation copying the value from the first register to a second register; and
   in response to a detection of the third instruction, set a second indicator associated with the second register the register write tracking table based on the first indicator.

10. The instruction processing circuit of claim 1 integrated into a semiconductor die.

11. The instruction processing circuit of claim 1 further comprising a device selected from the group consisting of: a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

12. An instruction processing circuit, comprising:
   a means for detecting a first instruction in an instruction stream indicating an operation writing a value to a first register, the value having a value size less than a size of the first register;
   a means for detecting a second instruction in the instruction stream indicating a masking operation on the first register; and
   a means for eliminating the masking operation upon a determination that the masking operation indicates a read operation and a write operation on the first register and has an identity mask size equal to or greater than the value size.

13. The instruction processing circuit of claim 12, further comprising:
   a means for setting a first indicator associated with the first register in a register write tracking table in response to a detection of the first instruction;
   the means for eliminating the masking operation comprising a means for eliminating the masking operation based on the first indicator.

14. The instruction processing circuit according to claim 13, further comprising:
   a means for detecting a third instruction in the instruction stream indicating an operation copying the value from the first register to a second register; and
   a means for setting a second indicator associated with the second register in the register write tracking table based on the first indicator in response to a detection of the third instruction.

15. A method for processing computer instructions, comprising:
   detecting a first instruction in an instruction stream indicating an operation writing a value to a first register, the value having a value size less than a size of the first register;
   detecting a second instruction in the instruction stream indicating a masking operation on the first register; and
   eliminating the masking operation upon a determination that the masking operation indicates a read operation and a write operation on the first register and has an identity mask size equal to or greater than the value size.

16. The method of claim 15, further comprising:
   responsive to detecting the first instruction, setting a first indicator associated with the first register in a register write tracking table,
   wherein eliminating the masking operation is based on the first indicator.

17. The method of claim 16, further comprising:
   detecting a third instruction in the instruction stream indicating an operation copying the value from the first register to a second register; and
   responsive to detecting the third instruction, setting a second indicator associated with the second register in the register write tracking table based on the first indicator.

18. A non-transitory computer-readable medium having stored thereon computer-executable instructions to cause a processor to implement a method comprising:
   detecting a first instruction in an instruction stream indicating an operation writing a value to a first register, the value having a value size less than a size of the first register;
   detecting a second instruction in the instruction stream indicating a masking operation on the first register; and
   eliminating the masking operation upon a determination that the masking operation indicates a read operation and a write operation on the first register and has an identity mask size equal to or greater than the value size.

19. The non-transitory computer-readable medium of claim 18 having stored thereon the computer-executable instructions to cause the processor to implement the method further comprising:
   responsive to detecting the first instruction, setting a first indicator associated with the first register in a register write tracking table,
   wherein eliminating the masking operation is based on the first indicator.

20. The non-transitory computer-readable medium of claim 19 having stored thereon the computer-executable instructions to cause the processor to implement the method further comprising:
   detecting a third instruction in the instruction stream indicating an operation copying the value from the first register to a second register; and
   responsive to detecting the third instruction, setting a second indicator associates with the second register in the register write tracking table based on the first indicator.

* * * * *